US008855683B1

United States Patent
White et al.

(10) Patent No.: US 8,855,683 B1
(45) Date of Patent: *Oct. 7, 2014

(54) PROVIDING INFORMATION TO A MOBILE DEVICE BASED ON AN EVENT AT A GEOGRAPHICAL LOCATION

(71) Applicants: James N. White, Dallas, TX (US); Monica Rose Martino, Plano, TX (US); M. Gregory Smith, Fairview, TX (US)

(72) Inventors: James N. White, Dallas, TX (US); Monica Rose Martino, Plano, TX (US); M. Gregory Smith, Fairview, TX (US)

(73) Assignee: Open Invention Network, LLP, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/794,095

(22) Filed: Mar. 11, 2013

Related U.S. Application Data

(63) Continuation of application No. 13/187,834, filed on Jul. 21, 2011, now Pat. No. 8,412,231, which is a continuation-in-part of application No. 12/150,413, filed on Apr. 28, 2008, now Pat. No. 8,219,110.

(60) Provisional application No. 61/370,265, filed on Aug. 3, 2010.

(51) Int. Cl.
*H04W 24/00* (2009.01)
*G08B 27/00* (2006.01)

(52) U.S. Cl.
CPC ..................................... *G08B 27/00* (2013.01)

USPC .................... 455/456.3; 455/456.1; 340/988; 702/3

(58) Field of Classification Search
USPC ........ 455/404.2, 456.1, 461, 417, 445, 414.1, 455/456.3; 379/49, 40, 211.02, 421, 379/207.16; 340/968, 988, 539.1, 585.1, 340/426.28, 506, 531; 706/12; 702/3
See application file for complete search history.

(56) References Cited

U.S. PATENT DOCUMENTS

| | | | |
|---|---|---|---|
| 6,970,183 B1* | 11/2005 | Monroe | 348/143 |
| 7,356,344 B2* | 4/2008 | Sato | 455/456.3 |
| 2005/0197775 A1* | 9/2005 | Smith | 702/3 |
| 2008/0094256 A1* | 4/2008 | Koen | 340/988 |
| 2008/0186162 A1* | 8/2008 | Rajan et al. | 340/539.13 |
| 2009/0177730 A1* | 7/2009 | Annamalai et al. | 709/202 |
| 2009/0186596 A1* | 7/2009 | Kaltsukis | 455/404.2 |
| 2011/0019664 A1* | 1/2011 | Dickinson et al. | 370/352 |

* cited by examiner

*Primary Examiner* — Mahendra Patel
(74) *Attorney, Agent, or Firm* — Haynes and Boone, LLP

(57) ABSTRACT

A system, method, and computer readable medium for providing information to a mobile device based on an event comprising detecting an occurrence of the event, determining if the event is a specific event and if the event occurred at or near a geographical location and sending an alert of the event to at least one mobile device if the event is the specific event, if the event occurs at or near the geographical location, and if the at least one mobile device is located at or near the geographical location.

16 Claims, 11 Drawing Sheets

FIGURE 11

Browser Interface Event Alert System Interface

| Item | Peak Value Change (Delta) | Within (seconds) | Notify | Method |
|---|---|---|---|---|
| Sensor 106 | 3 | 10 seconds | 214-244-5555, mail@domain.com 214-244-9889 | SMS(Sensor Info), email(video) SMS(jpg snapshot) |
| Sensor 106a | 10 | 30 seconds | mail@domain.com 214-244-9999 | Email(video) Voice msg 3(Sensor info) |
| Sensor 108 | 9 | 30 seconds | 214-244-5555, 214-999-4545 | Prerecorded voice message 4, voice message 6 |
| Sensor 106b | 5 | 20 seconds | 214-255-1478 | SMS(sensor info) |

PROVIDING INFORMATION TO A MOBILE DEVICE BASED ON AN EVENT AT A GEOGRAPHICAL LOCATION

CROSS-REFERENCE TO RELATED APPLICATIONS

This application is a continuation of U.S. application Ser. No. 13/187,834, entitled PROVIDING INFORMATION TO A MOBILE DEVICE BASED ON AN EVENT AT A GEOGRAPHICAL LOCATION, filed on Jul. 21, 2011, which claims priority from U.S. provisional application Ser. No. 61/370,265, entitled PROVIDING INFORMATION TO A MOBILE DEVICE BASED ON AN EVENT AT A GEOGRAPHICAL LOCATION, filed on Aug. 3, 2010. U.S. application Ser. No. 13/187,834 is also a continuation-in-part of U.S. application Ser. No. 12/150,413, titled PROVIDING INFORMATION TO A MOBILE DEVICE BASED ON AN EVENT AT A GEOGRAPHICAL LOCATION, filed on Apr. 28, 2008, now issued U.S. Pat. No. 7,219,110, issued on Jul. 10, 2012. The entire contents of each are incorporated by reference herein.

FIELD OF THE INVENTION

The present disclosure is generally related to a communications network, and more particularly to providing information to a mobile device based on an event at a geographical location in a communications network and to monitor persons moving through or by a geographic location via their cellular device signals.

BACKGROUND OF THE INVENTION

When an event occurs in a specific location, government agencies that respond to or are responsible for the event may send out alerts to nearby entities with details about the event. In this way, others may take preventative actions against the event. For example, an accident may have occurred at a busy interchange of highways. Current transportation authorities who monitor traffic flows may send out text alerts to electronic signals positioned at various highways to alert drivers nearby. Drivers who saw the text alert may then take preventative actions against the event, for example, by taking an alternate route.

By sensing distinct signals from cellular devices, one can detect the number of ambient device near a particular point. There isn't need to understand the content of the signals only that the distinct signals exist. Much like a radar detector, a WIFI signal detector, etc, inexpensive devices can be constructed which detect ambient distinct signals and can determine their number. By knowing the number, a monitoring system could be configured to detect changes in signal count which shows cellular devices in particular, but might in general reflect an group of individuals trespassing, increased car traffic, unauthorized or unknown gatherings of individuals. Using this knowledge, a system could be configured to extend warnings and notices electronically to parties that would interest in such events, as in a Homeowner's Association, security companies, anyone interested in inferring a detectable change in the number of individuals in a given area.

While current systems adequately alert events to people nearby, they fail to provide alerts to those who are on the move, for example, those who are not in the nearby area but are approaching the event location. This failure is due to the limitation of current systems, which provide alert information only to fixed locations, such as pre-installed electronic signals or wired telephone lines. Therefore, what is needed is ability to provide information to those who are not fixed in position, for example, mobile device users, no matter where they or their devices are geographically located.

SUMMARY OF THE INVENTION

The present disclosure describes a method for providing information to a mobile device based on an event at a geographical location. An occurrence of an event is detected. A determination is made as to whether the event is a specific event and if the event occurred at or near a geographical location. If the event is the specific event, occurs at or near the geographical location, and if the at least one mobile device is located at or near the geographical location, an alert of the event is sent to at least one mobile device.

In one embodiment, the detection of the event comprises sensing by a sensor an occurrence of an event above a predetermined threshold. Alternatively, the detection comprises capturing information about the event by at least one mobile device, sending the information to at least one service provider site, and forwarding the information to a repository.

In order to send an alert to the at least of mobile device, information about the event is first processed. An image is recognized from the information about the event, a type of the event is identified based on the image, and a location of the event is identified based on a location of the at least one mobile device.

When sending an alert of the event to at least one mobile device, in one embodiment of the present disclosure, a lookup of at least one mobile device associated with at least one service provider site is performed. The alert is then sent to the at least one mobile device associated with the at least one service provider site. In an alternative embodiment, the alert is sent to at least one service provider site. The alert is then forwarded from the at least one service provider site to at least one mobile device associated with the at least one service provider site.

In yet another embodiment of the present disclosure, a lookup of at least one mobile device associated with at least one service provider site is performed. A location of the at least one mobile device is identified. The alert is then sent to the at least one mobile device within a predetermined distance of the event based on the location.

In still yet another embodiment of the present disclosure, a location of at least one service provider site is identified from a geographical information system. The alert is sent to the at least one service provider site within a predetermined distance of the event based on the location. The alert is then forwarded from the at least one service provider site to at least one mobile device associated with the at least one service provider site.

In addition to sending alert messages based on geographical locations, the alert may be sent to the at least one mobile device based on a period of time the at least one mobile device is registered with a service provider site.

In a further embodiment of the present disclosure, a communications network for providing information to a mobile device based on an event at a geographical location is provided. The communications network comprises at least one mobile device utilized by at least one mobile user, at least one service provider site associated with the at least one mobile device; and an event alert system operable to detect an occurrence of the event, process information related to the event, and send an alert of the event to the at least one mobile device if the event is a specific event, if the event occurs at or near a geographical location, and if the at least one mobile device is located at or near the geographical location.

The embodiment of the present disclosure also allows for a sensor or sensors attuned to detecting cell phone or other mobile or wireless device signals as point source interfaces with a service center that through human intervention or algorithmic design can decide when to send alerts based on the change in ambient signals detected within the sensor's area. A threshold change allows the service center to issue alerts and recipients to effect a response.

BRIEF DESCRIPTION OF THE DRAWINGS

FIG. 9 depicts a sensor mounted atop a camera pole. The sensor in this simplified example detects distinct signals from Devices 200. The links (logical and physical) between the Event Monitor [Device 102] software which resides on the Event Alert System [Device 108]. Also represented is a logical diagram of Device 108 notifying User 112 via SMS TXT to Mobile Device 114 or via voice call through the Mobile Carrier network [Device 116].

FIG. 11 depicts a Browser Alert System Interface.

DETAILED DESCRIPTION OF THE INVENTION

Figure 1:
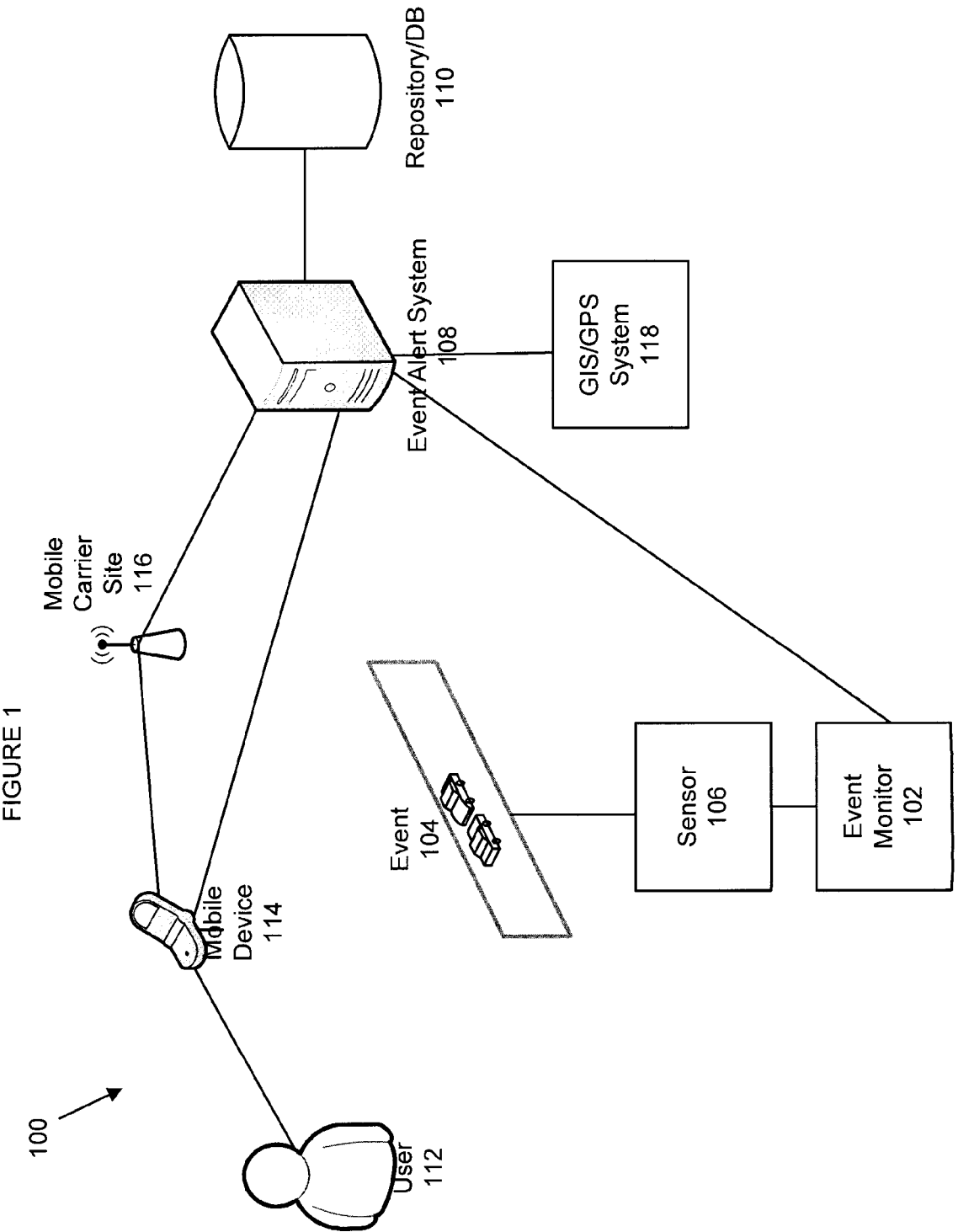
FIG. 1 depicts one illustrative embodiment of a communications network for providing information to mobile device based on an event at a geographical location.

Referring now to FIG. 1, one illustrative embodiment of a communications network for providing information to mobile device based on an event at a geographical location is depicted. In communications network 100, event monitor 102 is responsible for monitoring events 104 that occur in various geographical locations. Examples of event monitors include government or municipal agencies, such as police, fire departments, public safety answering points, and the like. Examples of events being monitored include a traffic accident, a construction detour, an explosion, a fire, a police pursuit, and the like.

Event monitor 102 may recognize events 104 by using operators or sensors 106 that are installed at the various geographical locations for detecting the occurrence of events 104. Examples of events that sensors 106 may detect include earthquakes, rain storms, electricity outage, and the like. In addition to sensors 106 that are installed at various geographical locations, sensors 106 may be installed within the event monitor 102 for monitoring events that occur above a predetermined threshold. For example, sensors 106 may be installed at the event monitor 102 to detect vibrations above a predetermined threshold to alert an earthquake.

When the event monitor 102 detects or senses an event 104, the event monitor 102 notifies an event alert system 108. The event alert system 108 stores the event 104 in a repository or database 110 and determines if the event is a specific event and if the event occurs at or near a geographical location. The event alert system 108 determines whether the event is a specific event based on a type and/or location of the event.

If the event is a specific event and if the event occurs at or near a geographical location, the event alert system 108 provides information related to the event to mobile devices 114 at or near the geographical location. In one illustrative embodiment, the event alert system 108 alerts the mobile device 114 by directly sending alert messages to mobile device 114. In order to send alert messages directly to mobile device 114, the repository or database 110 may comprise information of mobile device 114 at or near the geographical location. For example, repository or database 110 may comprise a table of mobile identification numbers (MINs) associated with service provider sites 116 at or near the geographical location. A mobile identification number (MIN) uniquely identifies a mobile device in a service provider network.

While alerts may be sent to mobile device 114 at or near the geographical location, the event alert system 108 may sent alerts to mobile devices 114 that are within a certain distance of the event 104. To determine the location of mobile device within a geographical area, the event alert system 108 may consult data stored within the geographical information system (GIS) or global positioning system (GPS) 118. For example, alerts may be sent to mobile device that are within a certain number of feet, miles, or yards of the event. In this way, only mobile devices 114 that are located within a certain distance of a geographical area affected by the event 104 may be alerted. No disruptions will be caused to the other devices.

In an alternative embodiment, the event alert system 108 may alert the mobile device 114 by sending alert messages to service provider sites 116 or other systems at the geographical location or within a certain distance of the event 104. Since each service provider site 116 keeps track of its mobile device 114 with their mobile identification numbers (MINs), no mobile device information will be stored in the repository or database 110. However, to determine service provider sites located at a geographical location or within a certain distance of the event, the event alert system 108 may consult data stored within the geographical information system (GIS) or global positioning system (GPS) 118. In response to receiving alert messages from the event alert system 108, service provider sites 116 forward the alert messages to its mobile devices 114, which in turn notify their mobile users 112.

The event alert system 108 may instruct service provider sites 116 to send a specific message to a mobile device 114 based on its location and heading relative to the event. For example, service provider sites 116 may send alert message A to mobile device 114 that are moving towards the event 104. Service provider sites 116 may also send alert message B or no alert message at all to mobile device 114 that are moving away from the event 104. In order to detect mobile device's location and heading relative to the event, the event alert system 108 may consult data stored within GIS/GPS system 118. In addition, service provider sites 116 may detect the received signal strength indication (RSSI) of its mobile devices 114 and determine their locations and headings relative to the event. Alternative to a specific message, the event alert system 108 may also instruct service provider sites 116 to send a generic alert message to all associated mobile device 114 with information related to the event 104.

Figure 2:
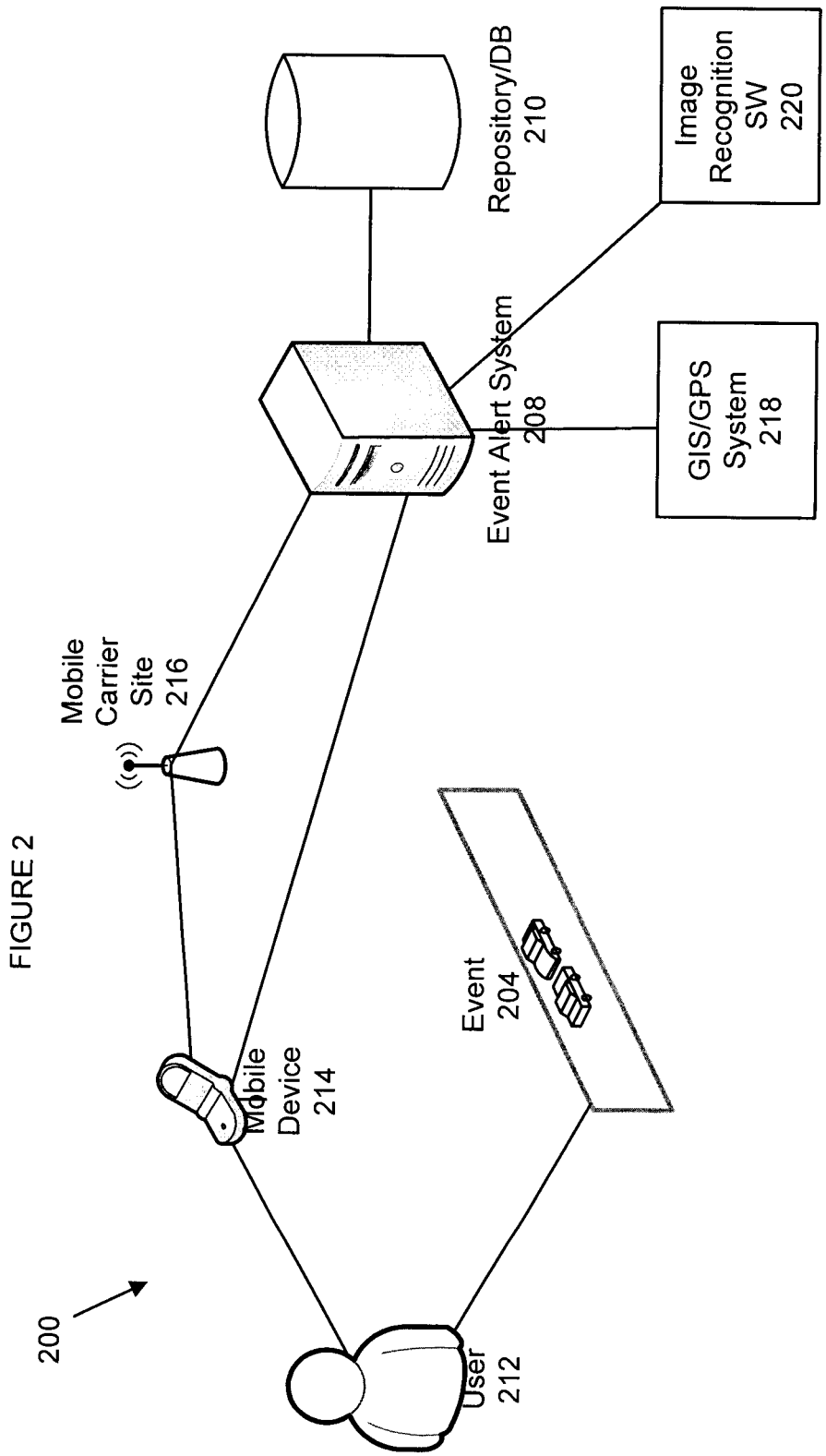
FIG. 2 depicts an alternative embodiment of a communications network for providing information to mobile device based on an event at a geographical location.

Alternative to detecting events by event monitor 102, events may be detected by the event alert system 108 from a reporting of the event originated from a person involved in the event or bystanders. FIG. 2 provides an alternative embodiment of a communications network for providing information to mobile device based on an event at a geographical location. In communications network 200, a person involved may capture information of the event 204 with mobile device 214. For example, mobile user 212 may take a picture of a scene of the accident with mobile device 214. Other examples of information captured by the mobile user 212 include videos, graphics, sounds, and the like.

Mobile user 212 may then report the event by sending the event information from mobile device 214 to the event alert system 208 via service provider sites 216. In response to receiving the event information, the event alert system 208 stores the event information in repository or database 210. Based on the event information, the event alert system 208 may utilize the GIS/GPS system 218 and image recognition software 220 to identify the location and/or the type of the event 204. The location, the type or a combination of the location and type of the event identifies the event as a specific event. The event alert system 208 then sends alert messages directly to mobile devices 214 at the geographical location or within a certain distance of the event 204. Alternatively, the event alert system 208 may send alert messages to service provider sites 216 at or near the geographical location or within a certain distance of the event 204. In response to receiving alert messages from the event alert system 108, service provider sites 216 may forward the alert messages to associated mobile devices 214, which in turn notify their mobile users 212.

Figure 3:
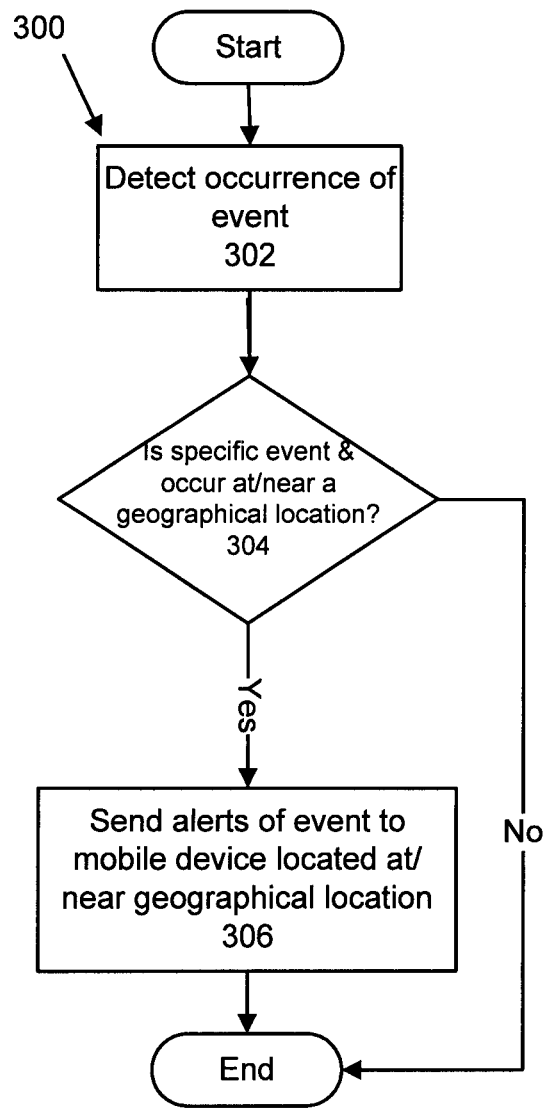
FIG. 3 depicts a flowchart of a method for providing information to mobile device based on an event at a geographical location.

FIG. 3 provides a flowchart of a method for providing information to mobile device based on an event at a geographical location. Process 300 begins at step 302 with detecting occurrence of an event. In one embodiment, the event may be detected using sensors. Alternatively, a person involved or bystanders may report an event by capturing event information with mobile devices. Next, the process continues to step 304 to determine if the event is a specific event, if the event occurs at or near a geographical location. The process then completes at step 306 to send alert messages either directly or indirectly to mobile devices if the event is a specific event, if the event occurs at or near a geographical location, and if the mobile device is at or near the geographical location.

Figure 4:
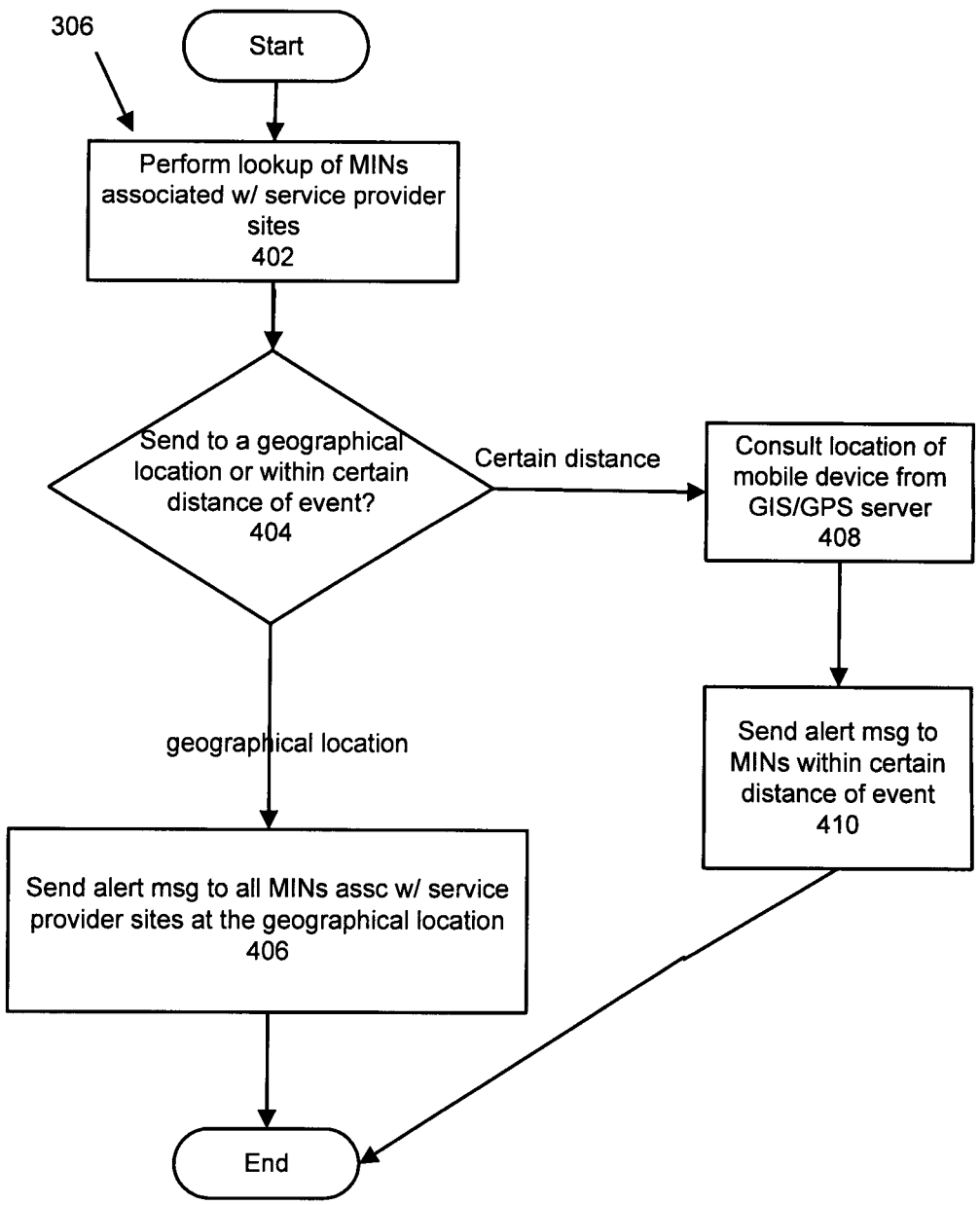
FIG. 4 depicts a flowchart of one exemplary method for sending alert messages directly to mobile devices.

FIG. 4 provides a flowchart of one exemplary method for sending alert messages directly to mobile devices. The process 306 begins at step 402 with performing a lookup of mobile devices associated with service provider sites based on their mobile identification numbers (MINs). In this example, the lookup may be performed at the service provider sites. Next, the process continues step 404 to determine whether alert messages should be sent to all mobile device at a geographical location or within a certain distance of the event.

If alert messages are to be sent to mobile devices at a geographical location, the process continues to step 406 to send alert messages to MINs associated with service provider sites at the geographical location. However, if alert messages are to be sent to mobile devices within a certain distance of the event, the process continues to step 408 to consult locations of mobile devices from data stored within a GIS/GPS server and completes at step 410 to send alert messages to MINs within a certain distance of the event.

Figure 5:
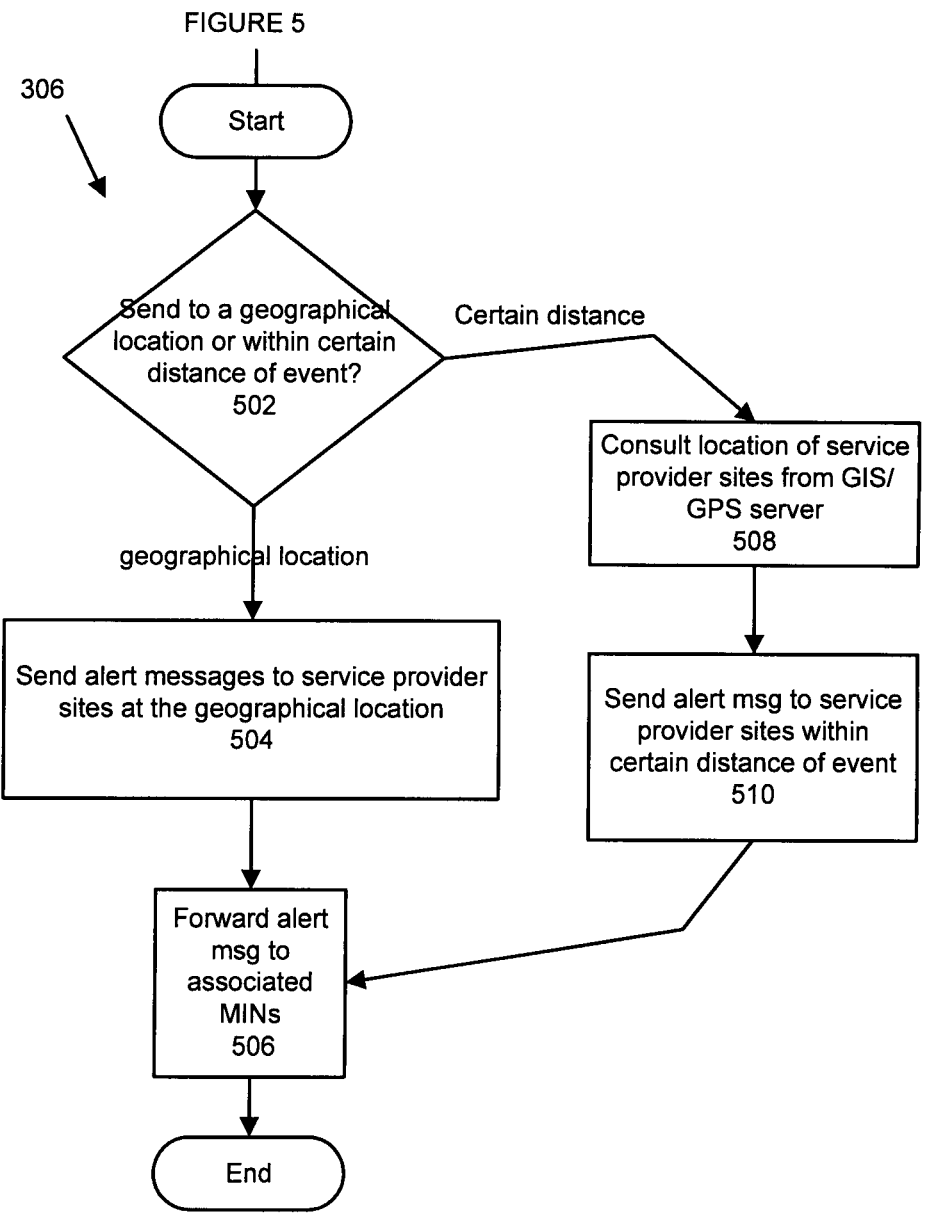
FIG. 5 depicts a flowchart of one exemplary method for indirectly sending alert messages to mobile devices.

FIG. 5 provides a flowchart of one exemplary method for indirectly sending alert messages to mobile devices. Process 306 begins with step 502 with determining whether alert messages should be sent to all mobile devices at a geographical location or within a certain distance of the event. If alert messages are to be sent to all mobile devices at a geographical location, the process continues to step 504 to send alert messages to service provider sites that are located at the geographical location. Subsequently, the process continues to step 506 to forward alert messages to MINs associated with the service provider sites.

However, if alert messages are to be sent to all mobile devices within a certain distance of the event, the process continues to step 508 to consult locations of service provider sites from data stored within a GIS/GPS server and to step 510 to forward alert messages to service provider sites that are within a certain distance of the event. The process 306 then completes at step 506 to forward alert messages to MINs associated with the service provider sites located within a certain distance of the event.

Figure 6:
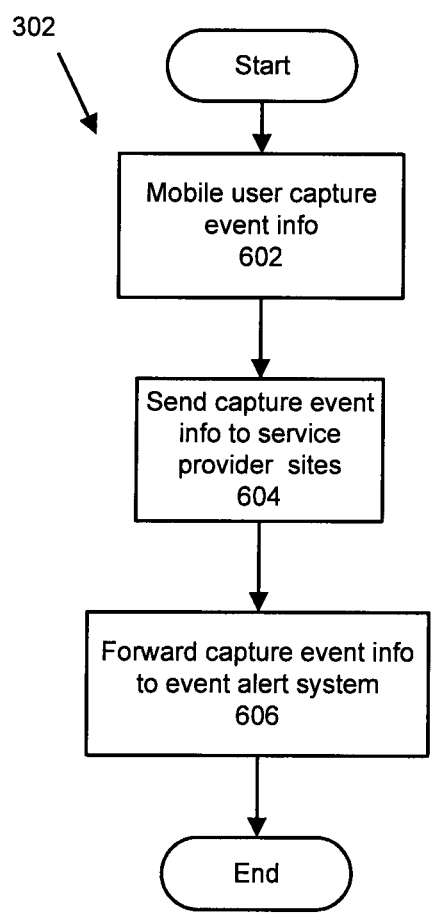
FIG. 6 depicts a flowchart of an exemplary method for detecting the event from a mobile device.

As discussed above, instead of using sensors to detect occurrence of events, a person involved or bystanders may report event information using their mobile devices. FIG. 6 provides a flowchart of an exemplary method for detecting the event from a mobile device. The process 302 begins at step 602 with a mobile user capturing information of the event with a mobile device. Next, the process 302 continues to step 604 to send the captured event information from a mobile device to a service provider site. The process 302 then completes at step 606 to forward the captured event information from the service provider site to the event alert system. Once the captured event information is received, the event alert system may store and process the information in a repository or database.

Figure 7:
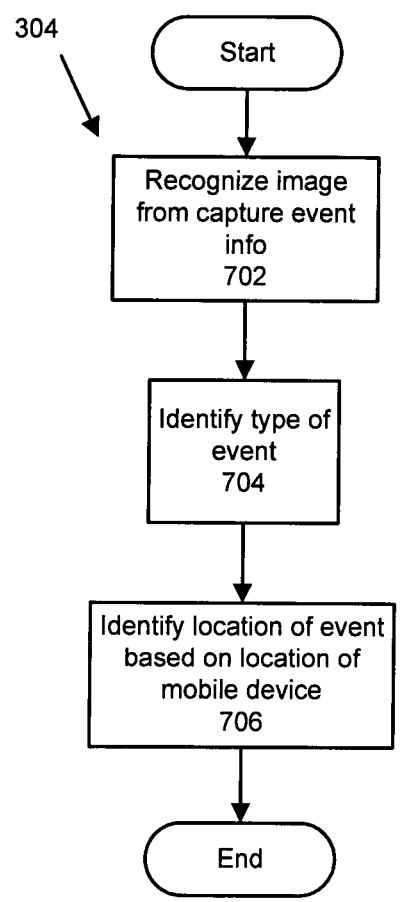
FIG. 7 depicts a flowchart of one exemplary method for processing the information in a repository or database.

FIG. 7 provides a flowchart of one exemplary method for processing the information related to the event in a repository or database. The process 304 begins at step 702 with recognizing an image from the captured event information. To accomplish this step, the captured event information may be compared to images stored within an image recognition software system. For example, the scene of an accident may be recognized by the image recognition software by comparing it to images of intersections stored within the image recognition software system.

Next, the process 304 continues to step 704 to identify a type of the event based on the recognized image. To accomplish this step, the information from the captured image may be compared to information stored within the repository or database. For example, the accident scene image recognized by the software may be compared to information stored within the repository or database and an accident event is identified. After the type of event is identified, the process 304 continues to step 706 to identify location of the event based on the location of the mobile device reporting the event or a recognized image. To accomplish this step, the event alert system may consult data stored within a GIS/GPS server. Based on the type, the location, or a combination of the type and location of the event, alert messages may be sent to mobile devices that are at or near the geographical location.

In addition to alerting events to mobile devices based on geographical location, alert messages may be sent based on time periods spent by mobile users in a particular geographical location. For example, alert messages may be sent only to mobile devices that have passed through or are registered with a service provider site within a certain period of time. Examples of periods of time include months, weeks, days, hours, minutes, and the like. In this way, alerts may be sent to mobile devices that are within the reach of a service provider site for a specific period of time. For example, if an accident occurred in a particular geographical location half an hour ago, alert messages may be sent to mobile device that have passed through or are registered with a service provider site located within a certain distance of the event for the past half hour, such that mobile users in the vicinity of the accident may take preventative action to avoid the scene. In order to identify mobile devices based on a period of time, it is preferable to store mobile identification numbers (MINs) associated with each service provider site for a period of time in the service provider site, a repository, or a database.

It is noted that the alert messages being sent to the mobile devices may include information related to the event in a form of text, voice, sound, graphics, email, short messages, and the like. In the event that a short message alert is sent, the message may be sent via a short message servicing center. In addition to text alerts, alert messages may include additional information about the event. For example, the alert message may include a link to obtain further information related to the event, a link to a map surrounding the location of the event, a suggestion of alternate route, etc. Furthermore, additional information about the event may include instructions from government agencies indicating precautions to take against the event. For example, the Homeland Security Department may send out information about the procedures for dealing with nuclear, biological, and chemical events.

Moreover, different types of alert messages may be sent based on the type of events that occurred. For example, short message type 1 (SMS1) may be sent for a general event, while short message type 2 (SMS2) may be sent for a more serious event. In addition, one or more types of messages may be sent simultaneously to a mobile device based on the type of events. For example, in an event of abduction, a text containing a license number and description of the abductor may be sent simultaneously with a picture of the abductee and a map of the abduction location.

Figure 8:
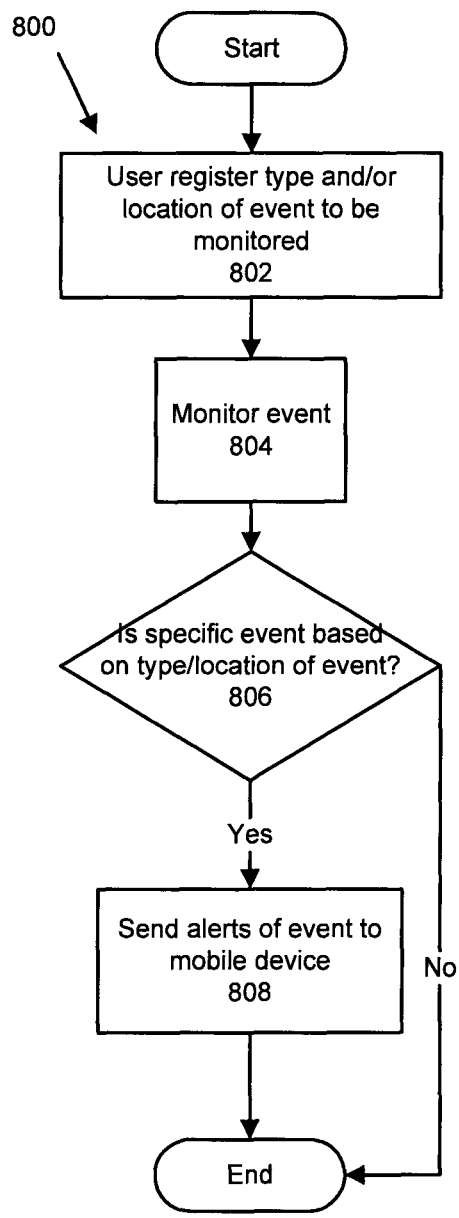
FIG. 8 depicts a flowchart of an exemplary method for providing information to a mobile device which initiated event monitoring.

In addition to initiating event monitoring by an event monitor or a person involved in the event, mobile users may register for monitoring of events and delivery of alert messages when the events occur. FIG. 8 provides a flowchart of an exemplary method for providing information to mobile device who initiated event monitoring. Process 800 begins at step 802 with a mobile user registering a location and/or type of event to be monitored. For example, a mobile user may register to monitor for a traffic accident at a particular intersection.

Next, process 800 continues to step 804 to monitor for the specific event. Process 800 continues to step 806 to determine if the event is a specific event based on the type and/or location of the event detected. This step may be accomplished by utilizing the GIS/GPS system and image recognition software. If the event is the specific event based on the location and/or type of the event detected, process 800 continues to step 808 to send messages alerting the event either directly or indirectly to the mobile device of the registered user. Otherwise, the process terminates thereafter.

In summary, aspects of the present disclosure provide a method and system for providing information to mobile device(s) based on an event at a geographical location. Events may be detected from sensors or reporting of the event by a person. Also, a mobile user may register and initiate event monitoring. Alerting of the events may be performed directly or indirectly. Alert messages may be sent directly to mobile devices that are associated with service provider sites in various geographical locations. Alert messages may also be sent first to the service provider sites or other systems, which then forward the messages to associated mobile devices. Event information may be stored in a repository or database or within the service provider sites. Aspects of present disclosure may utilize image recognition software and GIS/GPS servers to identify a location and a type of the event, such that a determination can be made as to whether the event is a specific event. In this way, alert messages may be sent to specific mobile devices at or near the geographical location of the event.

Figure 9:
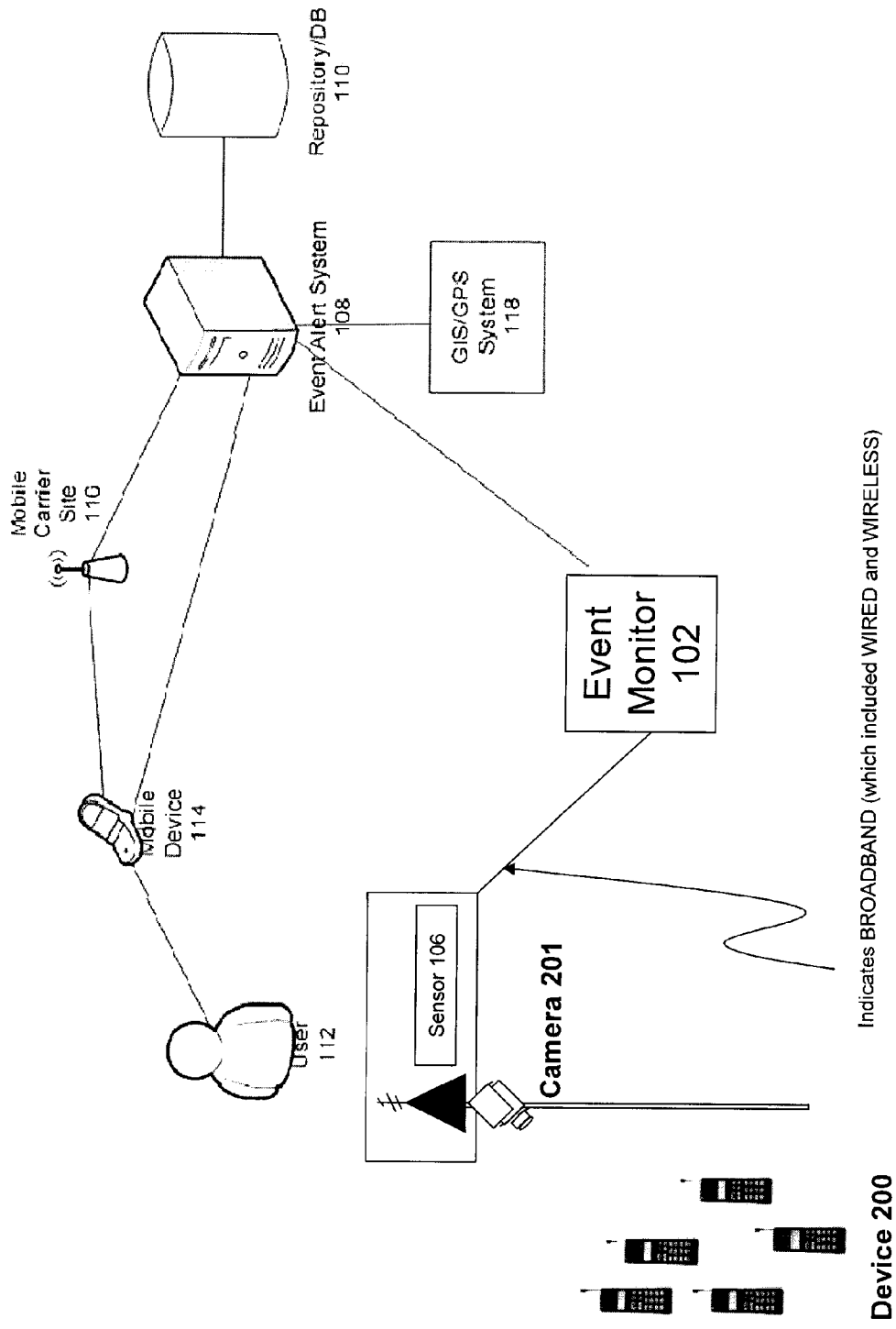
FIG. 9 depicts a typical configuration in a simplified diagram.

In additional embodiments, the ability to trigger dynamically upon the change in the number of distinct cell phones and to initiate some response is an embodiment of the instant application. Triggers are based upon change in the ambient background and by their nature indicate a change of static events occurring within a predetermined sensed area. In addition to alerting events to mobile devices based on geographical location, alert messages may be sent based on detections or changes in specified measurements. Referring now to FIG. 9, sensor 106 may be a device to detect the number of distinct mobile signals passing a certain point or within detection of a sensor. For example, sensor 106 is capable of detecting electronic emissions from cell phone band frequencies. This capability to detect is analogous to radar detectors, spectrum analyzers, etc. Components within the device detect emissions within the known cellular frequencies of the area. These are regulated and well defined. Camera 201 is a device that captures images within its operating range. Device(s) 200 are multiple cell phones possibly of different model, type, and service provider. When Sensor 106 detects signals (or electronic emissions) from device(s) 200, it relays in real-time a signal count to the Event Monitor 102. This detection might be in the form of the regular registrations that a cell phone is required to make in order to keep its service tower cognizant of the cell phone's location. This signal burst is not necessarily decoded, just detected. Device 102 then determines the location of the sensor and other event identifying information that might be programmed by the designer or implementer of the system, and passes that information to the Event Alert System 108. The location of the device might be static (permanently mounted) or mobile and can be provided via GPS.

Device 108 then compares the information received against a set of triggers and rules that have been selected by the implementer of the system. This information would be a count of the active signals it detects within its sensing area. The sensor itself doesn't manage triggers, it only sends the changes sensed in its environment. At the Event Alert System, if according to these predetermined rules a qualifying event is detected (such as there being a sudden jump of a number of devices 200 detected, for example three or more), or a drop in the number of signals, etc.) then Device 108 alerts individuals or logs the event based upon preferences provided by the implementer (such as SMS to an individual or by entering a log entry in to an event log). Other devices in FIG. 9 are device 110 (Repository/DB) a Repository or Database where the history of sensor messages are stored. Also in FIG. 9, a GIS/GPS system is tied to the location of Sensors like 106 and others of its type. This GPS system may provide moving maps to allow for mobile sensors, but also to interface with external systems, such as Security summoning systems (not shown), etc.

The sensor detects distinct point sources of EMI from cell phones (distinct cell bands) analogous to RADAR detectors, WiFi detectors, and spectrum analyzers. The signals are not interpreted or examined except for detection of their existence. The Sensor may then be configured to notify the Event Alert System when a threshold is passed. There is a web-based interface allowing configuration of the device. Ultimate protocol to the sensor is preferably HTTPS but may be another protocol suitable for sending and receiving information. The sensor has embedded HTTPS parsing capabilities.

FIG. 9 shows an example system for a Neighborhood Alert integrated within the Neighborhood's Security Cameras. The Event Alert System 108 in FIG. 9 can be set to note what the background number of cell signals are (such as the number of homes nearby and the cell signals that emanate from these homes). Within the Web Interface, the sensor can relay the number of detected signals at any given time. Since cell phone spectrum is strictly confined, there is limited spectrum to recognize for locating mobile signals. Then, when there is a change from the background number or level to some quantitatively larger value determined from a set of rules provided in the EVENT SERVER, a notification is sent.

Figure 10:
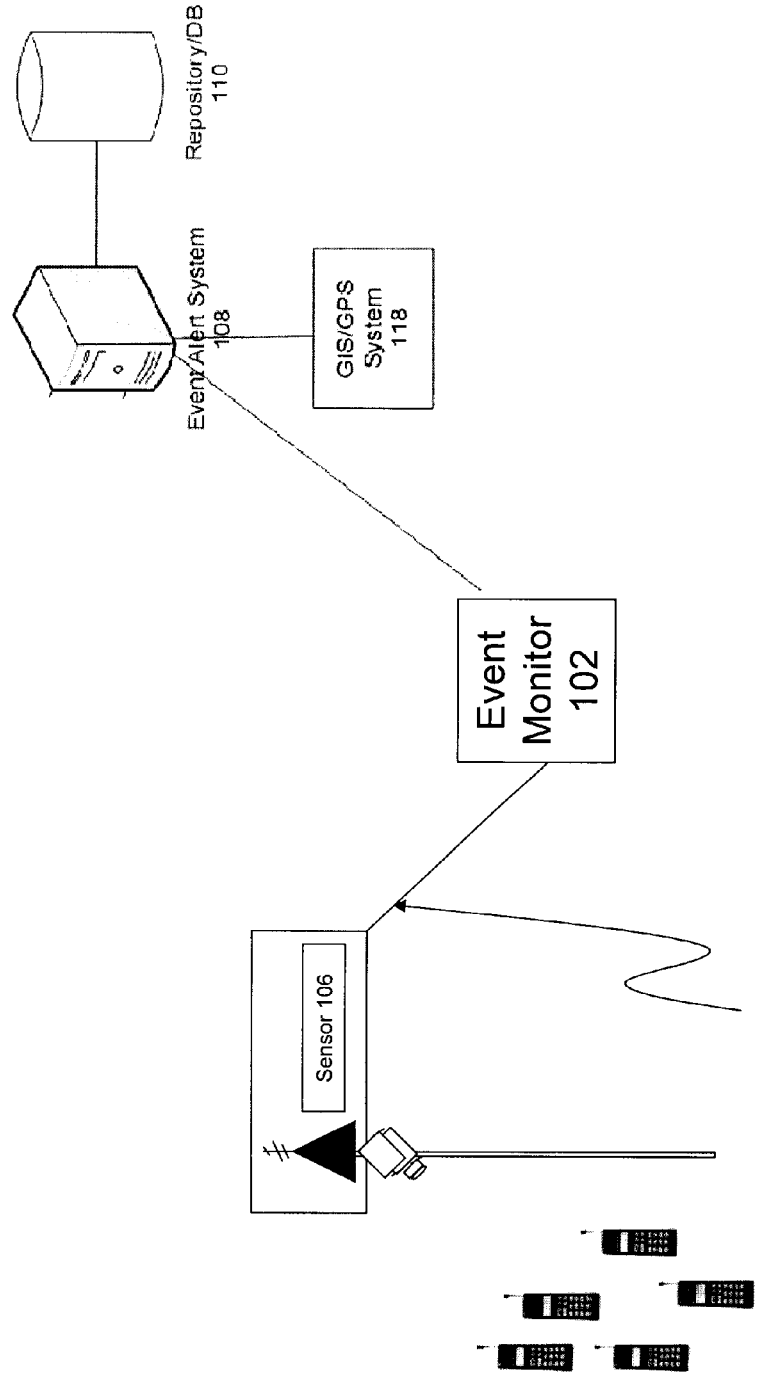
FIG. 10 depicts a possible sample event log. The Browser Interface Event Alert System would display and allow for categorization of events, setting of alarms, notifications, etc. There would be an Item column which depicts the Sensor being tied to a trigger. There might, for example, be a Peak Value Change (delta) in distinct signals detected, a time limit, notification party, and a method to effect the notification.

The Event Server may be located in a datacenter, or as a logical component of a larger computing device or shared algorithmic device. The Event Alert System will provide notification based on rules configured via software located on the Event Alert System and managed via a craftsperson or responsible and trained user and/or system implementer). Referring now to FIG. 10, based on such rules (which may be preconfigured or currently configured), the appropriate persons, devices, email accounts, pagers, etc. are notified. This is significant in that using cameras to detect scenery or heat signature or other detection systems leads to high false positives (authorized and expected persons returning home, pets, wind, weather, etc). Using the ubiquitous presence of mobile phones to track groups of individuals allows a highly selective warning conf FIG. 10 shows a sample view of the Browser Interface Event Alert System (BIEAS). This is a possible configuration and view of a configuration and notification tool. This sample table shows a hypothetical sensor sampling of Sensor 106, Sensor 106a, Sensor 108, Sensor 106b. The BIEAS shows a possible column tracking of Item, Column Peak Value Change(DELTA), Within(seconds), Column Notify, Column Method. Column Item refers to a unique sensor within each configuration or purview of the BIEAS instantiation. Column Peak Value Change (DELTA) refers to a possible trigger point for notification action. The DELTA refers to a change in the number of distinct signals within a period of time (COLUMN WITHIN). Column NOTIFY provides a target notification address. Here target address can be phone number, email address, text address, and so on. METHOD relates to how to invoke the target address (SMS, email, Voice message, etc.)

For the sample BIEA chart in FIG. 10, the first row refers to Sensor 106. It is assigned a Peak Value Change of 3 within 10 seconds. In this generic example, that would mean that when Sensor 106 detects a change in signals of 3 from the normal background count. Normal background count can be established via a rolling average (distinct counts in the last 10 sampling periods [Within Seconds column]) or via an input value (assigned value). When Sensor 106 detects a change equal to or greater than the Peak Value Change, an alert is generated. Following onto the NOTIFY column, here number 2142445555 is notified via the METHOD of SMS text that "SENSOR 106 DELTA REACHED"

For Sensor 106a, the DELTA change is 10 signals and the notification goes to an email address. For Sensor 108, a phone number receives a recorded or synthesized voice message. For 106b an SMS message.

The Browser Interface Event Alert System may have multiple interfaces to facilitate different kinds and orders of notifications. For example, Sensor 106 has three notification targets: 214-244-5555, mail@domain.com, and 214-244-9889. Items 214-244-5555 and mail@domain.com are to occur simultaneously as indicated by appearing on the same line together, separated by a comma. Item 214-244-9889 is to occur after the first step is completed. Step 1 shows notification of 214-244-5555 via SMS and simultaneously notification at mail@domain.com. Step 2 may or may not be configured to have a delay before execution of an SMS to 215-244-9889. In each case, the SMS text may encode information such as, "Sensor 106 threshold exceeded". The email may incorporate a similar wording.

Additionally, the system may be configured to send additional information configured by notification method. Sensor 106, SMS for 214-244-5555 is configured to send Sensor Info (e.g., what Sensor number and threshold triggered), email (short video of what has transpired at Sensor 106), or a jpg snapshot of that relative moment in time.

Upon receipt of the alarm notification, the system may be setup to allow for acknowledgement of receipt of the notification. The recipient of the SMS may reply as in the course of a normal SMS texting dialog with the action the system is to take. For example, the recipient may SMS back, "Reset", or "Notify alarm service", "Turn on camera recorder", or "Send video" or other such keyword/action definitions as deemed necessary and implemented within the system.

Systems and methods have been shown and/or described in the above embodiments for alerting events to mobile users based on geographical locations. Although the above descriptions set forth preferred embodiments, it will be understood that there is no intent to limit the invention by such disclosure, but rather, it is intended to cover all modifications and alternate implementations falling within the spirit and scope of the invention. Furthermore, the embodiments are intended to cover capabilities and concepts whether they be via a loosely coupled set of components or they be converged into one or more integrated components, devices, circuits, and/or software programs.

FIG. 11 depicts a Browser Alert System Interface. Various sensors 106, 106a, 106b, 108, a peak value change (or delta) within a certain amount of time (in seconds or even minutes), contact information as well as a method for notification.

What is claimed is:

1. A method, comprising:
  detecting an occurrence of an event, wherein detecting the occurrence of the event comprises sensing by a sensor the occurrence of the event;
  capturing information about the event by at least one mobile device, the information comprising location information and event type information;
  identifying the event via a remote event alert server based on a combination of a type of event and a location occurrence of the event; and
  receiving an alert of the event at the at least one mobile device if the event is a specific event, and if the event occurs at or near a geographical location, and if the at least one mobile device is located at or near the geographical location;
  wherein receiving the alert of the event at the at least one mobile device comprises:
    performing a lookup of the at least one mobile device associated with at least one service provider site; and
    sending the alert to the at least one mobile device based on a period of time the at least one mobile device is registered with the at least one service provider site and if the at least one mobile device is within a predetermined distance of the event based on the location.

2. The method of claim 1, wherein the occurrence of the event is above a predetermined threshold.

3. The method of claim 1, wherein if the event is a specific event and if the event occurred at or near the geographical location comprises at least one of:
 processing information related to the event, wherein the processing comprises:
 recognizing an image from the information about the event;
 identifying a type of the event based on the image; and
 identifying a location of the event based on a location of the at least one mobile device.

4. The method of claim 1, wherein receiving the alert of the event at the at least one mobile device comprises at least one of:
 performing a lookup of the at least one mobile device associated with at least one service provider site; and
 sending the alert to the at least one mobile device associated with at least one service provider site.

5. The method of claim 1, wherein receiving the alert of the event at the at least one mobile device comprises at least one of:
 sending the alert to at least one service provider site; and
 forwarding the alert from the at least one service provider site to the at least one mobile device associated with the at least one service provider site.

6. The method of claim 1, wherein receiving the alert of the event at the at least one mobile device comprises at least one of:
 identifying a location of at least one service provider site from a geographical information system;
 sending the alert to the at least one service provider site within a predetermined distance of the event based on the location; and
 forwarding the alert from the at least one service provider site to the at least one mobile device associated with the at least one service provider site.

7. The method of claim 1, wherein receiving the alert of the event at the at least one mobile device comprises at least one of:
 sending a first alert to a first mobile device moving towards the event; and
 sending a second alert to a second mobile device moving away from the event,
 wherein at least one of the first mobile device and the second mobile device is the at least one mobile device.

8. A non-transitory computer readable storage medium comprising instructions that when executed by a processor cause the processor to perform:
 monitoring a geographical area via at least one mobile device;
 capturing information about an event by a sensor communicably coupled to the at least one mobile device, the information comprising location information and event type information;
 identifying the event via an event alert server based on a combination of a type of event and a location occurrence of the event; and
 receiving an alert of the event at the at least one mobile device if the event is the specific event, and if the event occurs at or near the geographical location, and if the at least one mobile device is located at or near the geographical location;
 wherein receiving the alert of the event at the at least one mobile device comprises:
 performing a lookup of the at least one mobile device associated with at least one service provider site; and
 sending the alert to the at least one mobile device based on a period of time the at least one mobile device is registered with the at least one service provider site and if the at least one mobile device is within a predetermined distance of the event based on the location.

9. A network, comprising:
 at least one mobile device configured to:
 capture information about an event by a sensor communicably coupled to the at least one mobile device, the information comprising location information and event type information,
 send the information to a remote event alert system;
 the event alert system configured to:
 detect an occurrence of the event,
 process information related to the event,
 identify the event based on a combination of a type of event and a location occurrence of the event, and
 receive an alert of the event at the at least one mobile device if the event is a specific event, and if the event occurs at or near a geographical location, and if the at least one mobile device is located at or near the geographical location;
 wherein the alert of the event being received at the at least one mobile device comprises:
 a lookup of the at least one mobile device associated with at least one service provider site being performed; and
 the alert to the at least one mobile device being sent based on a period of time the at least one mobile device is registered with the at least one service provider site and if the at least one mobile device is within a predetermined distance of the event based on the location.

10. The network of claim 9, further comprising at least one event monitor, wherein the at least one event monitor is operable to perform at least one of: sense an occurrence of the event, determine if the event is above a predetermined threshold, and wherein the event monitor is operable to notify the event alert system of the occurrence of the event if the event is above the predetermined threshold.

11. The network of claim 9, wherein the event alert system is further operable to perform at least one of: a lookup of at least one mobile device associated with at least one service provider site, and send the alert to the at least one mobile device associated with the at least one service provider site.

12. The network of claim 9, wherein the event alert system is further operable to send the alert to at least one service provider site.

13. The network of claim 12, wherein the event alert system is further operable to cause the at least one service provider site to forward the alert from the at least one service provider site to the at least one mobile device associated with the at least one service provider site.

14. The network of claim 9, further comprising at least one geographical information system, wherein the event alert system is further operable to perform at least one of: identify a location of at least one service provider site from the at least one geographical information system, send the alert to the at least one service provider site within a predetermined distance of the event based on the location, and forward the alert from the at least one service provider site to the at least one mobile device associated with the at least one service provider site.

15. The network of claim 9, further comprising:
at least one image recognition system; and
at least one geographical information system, wherein the at least one image recognition system is operable to perform at least one of: recognize an image from the information about the event, the event alert system further operable to identify a type of the event based on the image, and identify a location of the event based on a location of the at least one mobile device from the at least one geographical information system.

16. The network of claim 9, wherein the event alert system is further operable to perform at least one of:
register at least one mobile user associated with the at least one mobile device;
monitor a specific event;
determine if the monitored event is the specific event based on a type of the event and a location of the event; and
send an alert of the event to the at least one mobile device if the event is the specific event.

\* \* \* \* \*